United States Patent [19]

Severinsky

[11] Patent Number: 5,315,497
[45] Date of Patent: May 24, 1994

[54] SYMMETRICAL UNIVERSAL AC-AC POWER CONDITIONER

[75] Inventor: Alex J. Severinsky, Silver Spring, Md.

[73] Assignee: Premier Power, Inc., McLean, Va.

[21] Appl. No.: 788,946

[22] Filed: Nov. 7, 1991

[51] Int. Cl.$^5$ .............................................. H02J 3/01
[52] U.S. Cl. ........................................ 363/34; 363/37; 363/39
[58] Field of Search .............. 363/34, 35, 36, 37, 363/39, 40, 41, 44, 48

[56] References Cited

U.S. PATENT DOCUMENTS

| | | | |
|---|---|---|---|
| 4,827,151 | 5/1989 | Okado | 363/37 |
| 4,933,831 | 6/1990 | Takahashi et al. | 363/37 |
| 4,934,822 | 6/1990 | Higaki | 363/37 |
| 4,935,861 | 6/1990 | Johnson et al. | 363/41 |
| 5,017,800 | 5/1991 | Divan | 363/37 |
| 5,045,989 | 9/1991 | Higaki et al. | 363/41 |
| 5,063,490 | 11/1991 | Maehara et al. | 363/37 |
| 5,111,373 | 5/1992 | Higaki | 363/39 |
| 5,126,585 | 6/1992 | Boys | 363/37 |

Primary Examiner—R. Skudy
Assistant Examiner—Jeffrey Sterrett
Attorney, Agent, or Firm—Banner, Birch, McKie & Beckett

[57] ABSTRACT

An apparatus is disclosed which is capable of conditioning any of a variety of utility service AC power inputs having distortion and noise into a clean AC power signal at the output by using symmetrical topology. The present invention is capable of maintaining a constant voltage amplitude at the output while the input utility voltage amplitude varies, and attenuates any distortions present at the input. The present invention first comprises a boost converter comprised of four semiconductor switches in parallel with a diode bridge to convert the incoming AC signal into a DC signal which is stored on two storage capacitors. Secondly, using a buck inverter, the stored DC signal is reconverted into a clean AC signal applied to the output. Input and output filters are used to help clean the signal, and chokes are used to help separate damaging signals produced by the converter and inverter from the storage capacitors. Appropriate control circuits for operating the semiconductor switches in the boost converter and buck inverter are also disclosed.

19 Claims, 8 Drawing Sheets

1

SYMMETRICAL UNIVERSAL AC-AC POWER CONDITIONER

BACKGROUND OF THE INVENTION

1. Technical Field

This invention relates to the field of electric utility power conditioning, and more particularly to power conditioners which involves a) maintaining voltage amplitude on the output to the load constant while an input utility voltage amplitude varies, and b) attenuating any distortions present in the input utility voltage waveform to the output.

The universality of the power conditioner of the present invention is in its ability to condition electric power delivered by different electrical services like 208/120 V dual phase service with two phases having phase shifts of 120 or 240 degrees; 240/120 V split phase service with two phases having phase shifts of 180 degrees; or single phase service with any voltage like 200 V, 208 V, 220 V, and 240 V. The frequency of any service can be any frequency used in the world, namely 50 or 60 Hz nominally, but generally in the range of 45 to 66 Hz.

2. Related References

Related references in the present invention's field include power supplies, power conditioners, and uninterruptible power supplies (UPS). Three patents have been found which are closely related to this subject.

U.S. Pat. No. 5,017,800 to Divan describes an electronic circuit which acts as a single phase power conditioner or UPS for only one type of electrical service - single phase with one grounded conductor (neutral). The main disadvantage of using this circuit is that output voltage shall be always smaller than the input voltage. This is a significant problem because the majority of power related problems are undervoltages and sags. Because the purpose of the power conditioner is to regulate the output at nominal nominal service value, like 120 V or 208 V, the conditioner will not be able to do it alone when input voltage is below nominal, undervoltage. Divan suggests using a transformer to amend this problem, see FIG. 4, but this greatly diminishes the value of the invention because the transformer's weight and size far exceed the weight and size of the electronic portion of the device. The use of the transformer also increases cost to such an extent that the smaller number of power semiconductor switches claimed in this invention versus similar purpose instruments does not provide for a total cost advantage. Regardless of these disadvantages, Divan can not be used for dual phase and other services, and therefore can not be a universal service conditioner/UPS.

U.S. Pat. No. 4,935,861 to Johnson et al. describes an invention almost identical to Divan's with capacitors C1 and C2 used instead of the active switches S1 and S3 used in Divan's invention. This invention has all the same disadvantages as Divan's plus one more. In Divan's invention, the waveform of the input current has limited control by switches S1 and S2 in such a way that the current can be sinusoidal in waveform and therefore input power factor values close to unity can be realized. Conversely, in Johnson's invention, the input circuit acts as a regular rectifier with capacitive filter, C1 and C2. It is well known that the input power factor of such a circuit is low, generally in the range of 0.4 -0.6. The current waveform is very distorted from sinusoidal and therefore there are large current harmonics which cause significant overheating of neutral conductors in the building wiring. This is one of the most frequent causes of building fires.

U.S. Pat. No. 4,934,822 to Higaki describes an AC-AC power supply acting as a power conditioner. This invention is an improvement over U.S. Pat. No. 4,827,151 to Okado. Okado's problem was that high frequency switching noise was generated on both output power conductors, compared to the grounded input conductor of Higaki's FIG. 2. Higaki's invention eliminated this high switching frequency component but left other signals on both output power conductors shown in FIGS. 4C and 4D. Those signals have sharp edges which contain high frequency harmonics that cause different problems in connected loads, like computer malfunction, magnetic component overheating, etc. All loads are designed to operate from sine waveform voltages on any power carrying conductors. Therefore this invention can hardly be used alone as a power conditioner, but only in conjunction with an isolation transformer which can eliminate this problem called "common mode voltage" Because of this disadvantage, Higaki can not be applied for universal service applications.

OBJECTS OF THE PRESENT INVENTION

An object of the present invention is to overcome the disadvantages of the related references described above and to provide a power conditioner usable with any electrical service around the world.

Another object of the present invention is to provide a power conditioner applicable to minicomputers. Generally, minicomputers require power in the range 3 to 15 kVA. In this power range, common electrical services worldwide include:

a) Dual phase 208/120 V consisting of two phases 120 V each with common grounded conductor (neutral). Phase voltages are phase shifted 120 or 240 degrees and therefore voltage between phases is 208 V.

b) Split phase 240/120 V consisting of two phases 120 V each with common grounded conductor (neutral). Phase voltages are phase shifted 180 degrees and appear as a single phase voltage split into two equal parts.

c) Single phase voltages with nominal amplitudes 200 V (Japan); 208 V, 220 V (Continental Europe), 240 V (United Kingdom countries) and many other service voltages in between. In these services, generally one power carrying conductor is grounded but not identified as such. It is also possible to have the center point (neutral) of the electrical service transformer grounded as in 208 V service in the USA or Canada.

The frequency of the sinewave voltage of the above services nominally is 50 or 60 Hz. In cases small utility generators, frequency can be in the range 45 to 66 Hz.

The advantage of a universal power conditioner is that only one physical unit per minicomputer system is required for service anywhere in the world. The present invention fulfills this advantage.

SUMMARY OF THE INVENTION

The present invention contains:

a) A two phase or single phase input voltage boost converter which draws sinewave current from any phase of the connected service. The converter is symmetrical in construction in regards to a common conductor which is connected to the input common conductor-neutral when it is available.

b) A DC link with two capacitors symmetrically connected to the same common conductor.

c) A two phase buck inverter producing a regulated sinewave voltage waveform on two output power conductors, symmetrically, versus the common conductor, in synchronism and phase locked to the input voltage frequencies and phases.

d) Input and output filters to filter out high frequency switching and its harmonics, also symmetrical in construction versus the common conductor.

This combination of the functional blocks and total symmetry of the circuit allows the present invention to uniquely achieve the desired functioning: worldwide service application, sinewave input current, and a regulated nominal sinewave output voltage free of distortions typical in the input utility service voltage.

DETAILED DESCRIPTION

Figure 1:
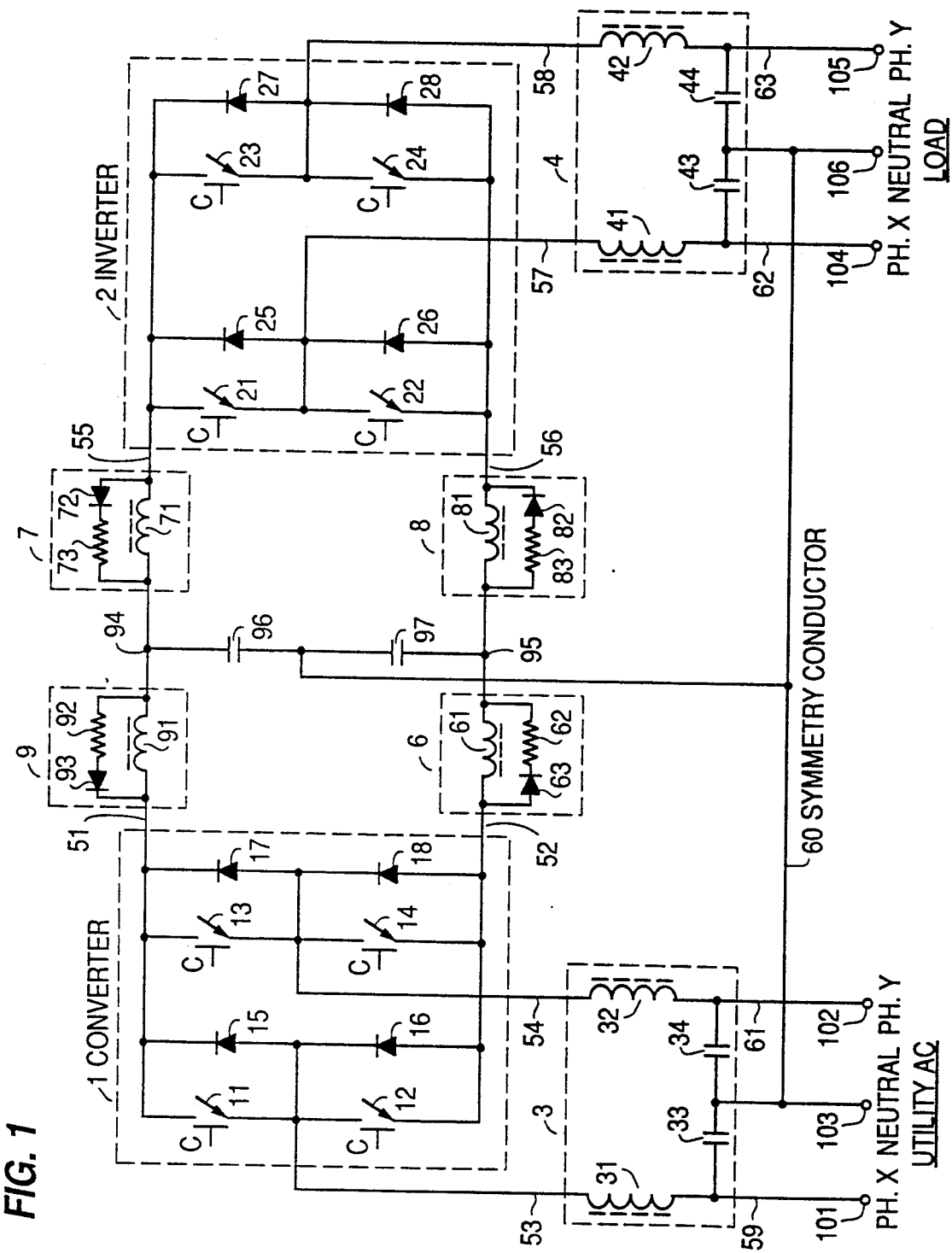
FIG. 1 shows power circuits of the symmetrical universal AC-AC power conditioner of the present invention.

Power Circuits, FIG. 1

The first major functional block of the conditioner of the present invention is Boost Converter 1. It is a full bridge circuit identical to one used in full bridge inverters. It consists of four semiconductor switches 11, 12, 13, 14. Those switches have control terminals marked "C" Many different controlled semiconductors may be used as switches like bipolar transistors, Darlington transistors, MOSFETS, IGBTs, GTOs, etc. The arrow shows the direction of the controlled current flow. Switches 11-14 control current flow in one direction shown by this arrow. The power supplied to the control terminal is negligible in comparison with the power turned on or off by the switch. The switches are connected between incoming phase conductors 53 and 54, and output DC conductors 51 and 52. Conductor 51 ("+DC conductor 51") has positive voltage in relation to conductor 52 ("−DC conductor 52"). Switches 11-14 are connected so that controllable current flows from +DC conductor 51 into phase conductor 53 or 54 and from phase conductor 53 or 54 into −DC conductor 52. There are also four diodes 15, 16, 17 and 18 connected in parallel with switches 11-14 so that the current flows in the opposite direction versus the one allowed by switches 11-14.

The second major functional block is Buck Inverter 2 which is identical in construction to converter 1. It connects output phase conductors 57 and 58 to +DC conductor 55 and −DC conductor 56. The components are four semiconductor switches 21-24 and four diodes 25-28. The connection of components is identical to Converter 1.

The third functional block is input filter 3. It has two chokes 31 and 32 connected in series with phase power conductors, and two capacitors 33 and 34 connected between each input phase conductor 59 and 61, and symmetry conductor 60. Choke 31 connects input phase conductor 59 with phase conductor 53 feeding converter 1. Choke 32 connects the other input phase conductor 61 to the phase conductor 54 feeding converter 1. The electrical parameters of chokes 31-32 and capacitors 33-34 are substantially the same. The input phase X terminal 101 is attached to input phase conductor 59, input phase terminal 102 is attached to input phase conductor 61, and input neutral terminal 103 is attached to symmetry conductor 60.

The forth functional block is output filter 4. It has identical construction as the input filter 3. Choke 41 connects output phase conductor 62 with phase conductor 57 fed by inverter 2. Choke 42 connects output phase conductor 63 with output phase conductor 58 fed by inverter 2. Capacitors 43 and 44 are connected between symmetry conductor 60 and output phase conductors 62 and 63 respectively. Again, electrical parameters of chokes 41-42 and capacitors 43-44 are substantially identical; they can have the same parameters as input filter 3 but are not required to be the same. Output phase X conductor 62 is attached to output phase X terminal 104, output phase Y conductor 63 is attached to output phase Y terminal 105, and output neutral terminal 106 is attached to symmetry conductor 106.

There are two DC link capacitors 96 and 97. Capacitor 96 is connected between +DC link conductor 94 and symmetry conductor 60, and capacitor 97 is connected between −DC link conductor 95 and symmetry conductor 60. Capacitors 96 and 97 have substantially identical electrical parameters.

For reliability and cost, current snubbers 6, 7, 8, 9 should be used. In principle, conductors 51, 94, 55 and 52, 95, 56 can be connected to together in each group without affecting performance of the present invention. Snubbers 6-9 reduce electrical stress imposed on all power semiconductors and diodes during turn on and off of switches during operation. Importantly, snubbers 7 and 8 will have components with substantially identical electrical parameters, and snubbers 6 and 9 also will have components with substantially identical electrical parameters. Snubber choke 91 connects conductors 51 and 94, snubber choke 71 connects conductors 55 and 94, snubber choke 61 connects conductors 52 and 95, and snubber choke 81 connects conductors 56 and 95. Each snubber choke has a parallel circuit consisting of a resistor and a diode: choke 91—resistor 92 and diode 93; choke 71—resistor 73 and diode 72; choke 61—resistor 62 and diode 63; and choke 81 resistor 83 and diode 82. The diodes are connected so that current is conducted from inverter 2 to converter 1 by diodes 72 and 93 connected to chokes 7 and 9 respectively, and from converter 1 to inverter 2 by diodes 63 and 82 connected to chokes 6 and 8 respectively.

Figure 2:
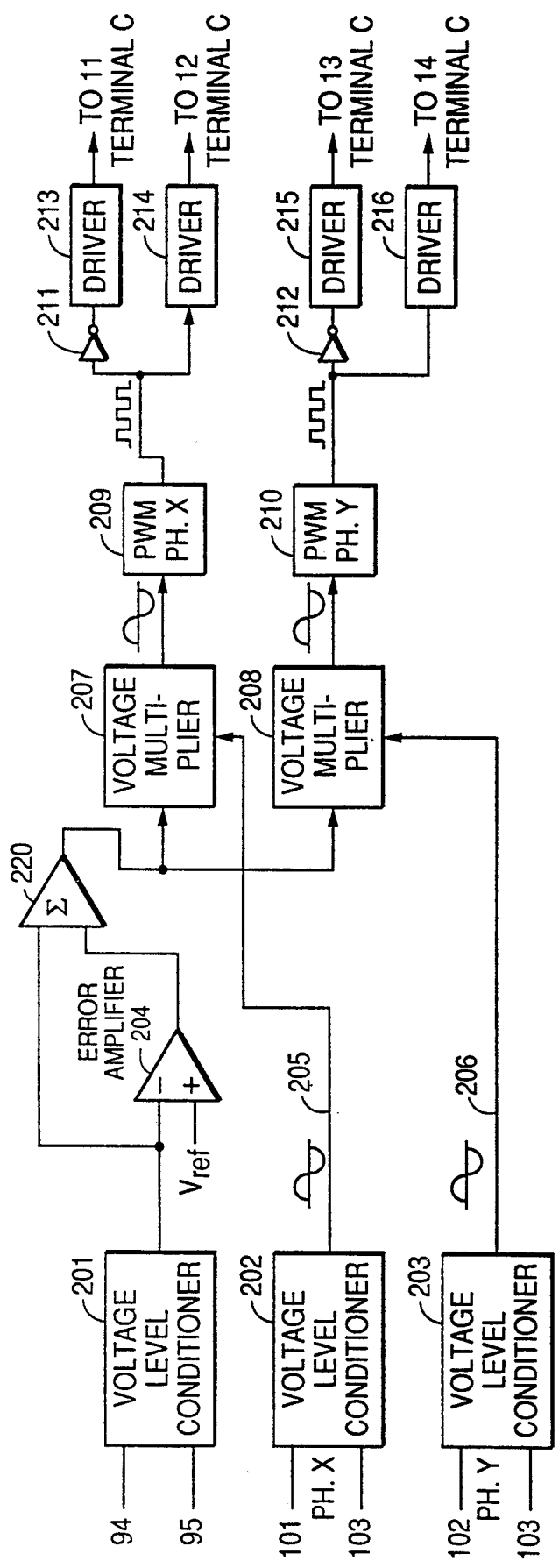
FIG. 2 shows control circuits for the boost converter of the symmetrical universal AC-AC power conditioner shown in FIG. 1 of the present invention.

Control Circuits for Boost Converter 1, FIG. 2

FIG. 2. shows three voltage level conditioners 201, 202 and 203 coupled to converter 1 of FIG. 1. The function of conditioners 201-203 is to reduce power circuit voltage values down and to shift the voltage level if necessary so that common integrated circuits can be used to operate on those voltages. Conditioner 201 conditions the voltage of both DC link capacitors 96 and 97. Input to conditioner 201 is connected to +DC conductor 94 and −DC conductor 95. Conditioner 202 conditions input voltage of phase X and is connected on the input to terminals 101 and 102. Conditioner 203 conditions input phase voltage Y and is connected on the input to terminals 102 and 103.

Output of conditioner 201 is input to error amplifier 204 which has the other input connected to reference voltage $V_{ref}$.

Output of amplifier 204 and output of conditioner 201 are connected to a summing amplifier 220. The output of amplifier 220 feeds one of two inputs of voltage multipliers 207 and 208. The other inputs of multipliers 207-208 are connected to the output of voltage conditioners 202 and 203.

Output of multiplier 207 is connected to the input of pulse width modulation (PWM) circuit 209, and output of multiplier 210 is connected to the input of substantially identical PWM circuit 210. There are PWM circuits with voltage or current control for switching regulators and both can be employed. If current control PWM are used, current sensors should be added to power circuit of converter Output of PWM circuit 209 is fed to driver 214 and though logic inverter 211 to driver 213. Likewise, output of PWM circuit 210 is fed to driver 216 and through logic inverter 212 to driver 215.

All driver circuits 213-216 are substantially identical, and they function to shift the level of the logic voltage to make it compatible with the level required by control terminals of converter semiconductor switches 11-14, i.e., to change the amplitude of the voltage for required operation of the control terminal of those switches and to provide sufficient power to those terminals. There are numerous driver circuits well known which are based on transformers, optocouplers, and level shifters. However, it is immaterial for the purpose of this invention which driver is used.

Driver 213 output feeds control terminal of switch 11, driver 214 output feeds control terminal of switch 12, driver 215 output feeds control terminal of switch 13, Driver 216 output feeds control terminal of switch 14.

Figure 3:
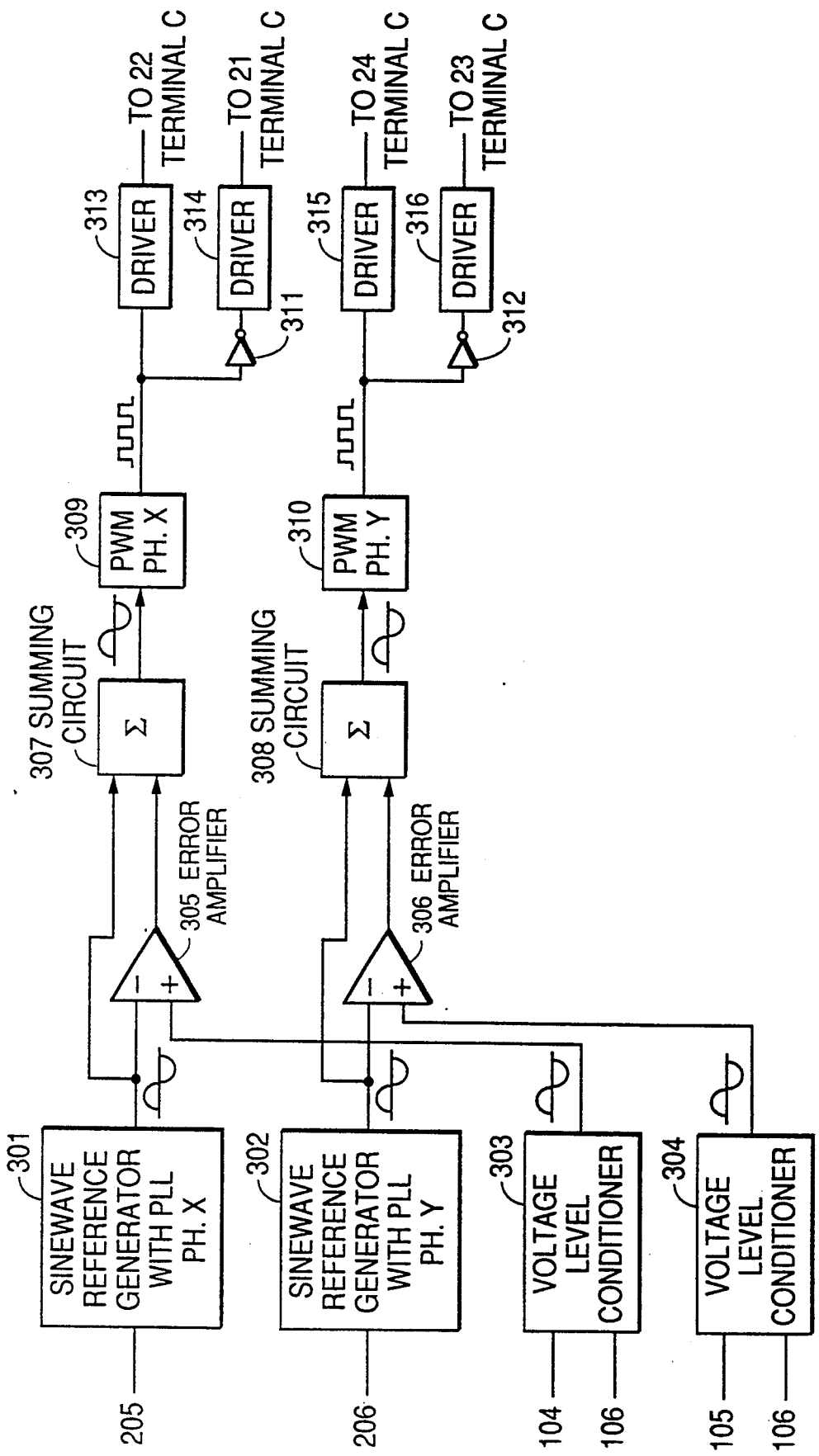
FIG. 3 shows control circuits for buck inverter of the symmetrical universal AC-AC power conditioner shown in FIG. 1 of the present invention.

Control Circuit for Buck Inverter 2, FIG. 3

FIG. 2 shows two substantially identical sinewave reference waveform generators 301 and 302. Both of them have phase lock loop circuits to synchronize the frequency of this waveform to the input service frequency and to be in phase lock with input phases X and Y, respectively. There are numerous well known circuits which function in this way. Phase lock and synchronization signal input to circuit 301 is provided from input phase X via conditioner 202 from its output 205, and phase lock and synchronization signal to circuit 302 is provided from input phase Y via conditioner 203 from its output 206, both shown in FIG. 2.

Two substantially identical voltage level conditioners 303 and 304, substantially identical in functioning to conditioners 202 and 203, are shown in FIG. 3 Conditioner 303 inputs are connected to output phase X terminals 104 and 106, and conditioner 304 inputs are connected to output phase Y terminals 105 and 106.

Output of reference generator 301 and phase X conditioner 303 are connected to the input of the error amplifier 305, and output of reference generator 302 and phase Y conditioner 304 are connected to the input of the error amplifier 306. Outputs of reference generator 301 and error amplifier 305 are connected to summing circuit 307, and outputs of reference generator 302 and error amplifier 306 are connected to summing circuit 308. Outputs of summing circuits 307 and 308 feed PWM circuits 309 and 310 respectively.

Output of PWM circuit 309 is connected to driver 313 and via logic inverter 311 to driver 314. Similarly, output of PWM circuit 310 is connected to driver 315 and via logic inverter 312 to driver 316. Driver circuits 313-316 are substantially identical in functioning to driver circuits 213-216 with exception of different electrical performance required if inverter 2 switches 21-24 are different from converter 1 switches 11-14.

DESCRIPTION OF OPERATION

General Description of Operation, FIG. 1

Converter 1 with its filter 3, snubbers 6 and 9, and its control circuit charges capacitors 96 and 97 with equal charge which creates a voltage value higher than the peak voltage value in any utility phase X or Y on the input. Converter 1 boosts utility voltage and therefore is called a Boost Converter. The capacitance value of capacitors 96 and 97 is such that the voltage on these capacitors is near constant during each cycle of the utility voltage. For example, for a utility voltage input of 120 VRMS (170 V peak), capacitor 96 and 97 would preferably have a value of 220 V each.

The converter control circuit of the present invention regulates voltage on capacitors 96 and 97 to the predefined value. So, when the amplitude of the utility phase voltage changes to be below nominal value or above nominal value, voltage on capacitors 96-97 is maintained or regulated at the constant level.

Figure 4A:
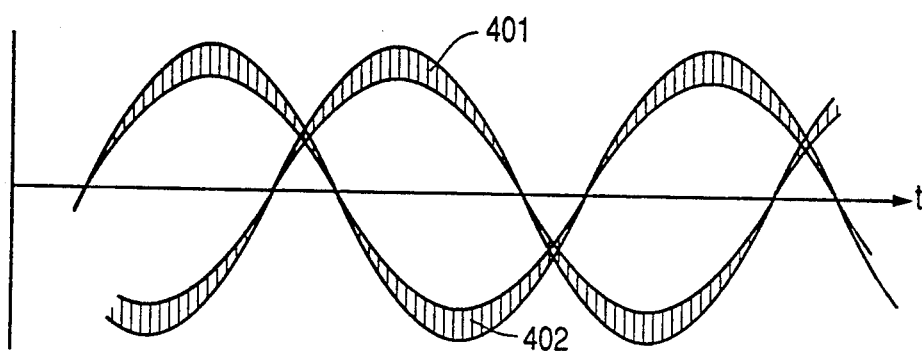
FIGS. 4A, 4B, and 4C show examples of voltage diagrams for the case of dual phase conditioning with 120 degrees phase shift between phases X and Y.
Figure 4B:
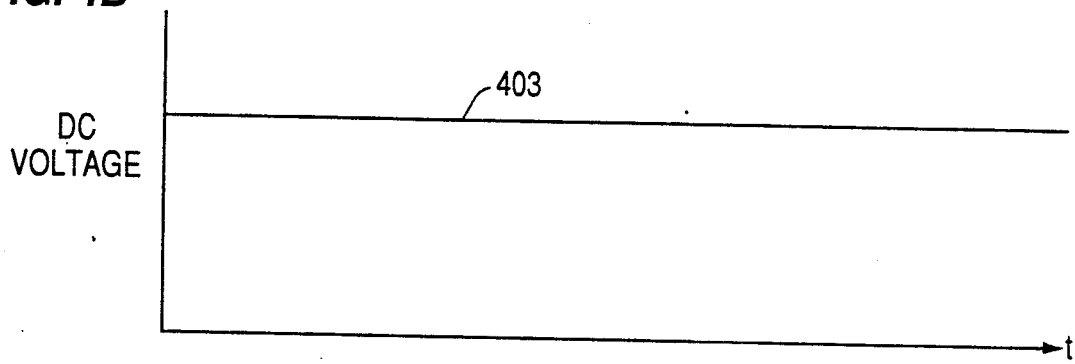

FIG. 4A shows two utility phase voltage waveforms 401, phase X, and 402, phase Y, for the case of dual phase service with 120 degrees phase displacement between phases. The range of usual waveform change is also shown for each phase. FIG. 4B shows the DC voltage 403 on capacitors 96 and 97 versus voltages in incoming utility phases shown in FIG. 4A.

Figure 4C:
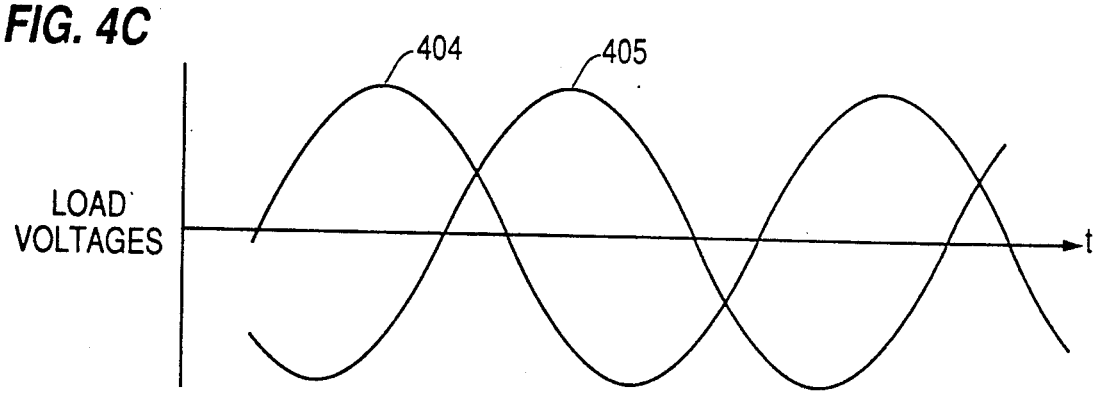

Inverter 2 with its filter 4, snubbers 7 and 8, and its control circuit functions opposite to converter 1. It inverts the DC voltage on capacitors 96 and 97 to alternating AC voltage waveforms on its output to a load, also on phases X and Y. FIG. 4C shows inverter output voltage waveforms for both phases for the same case of dual phase utility service, waveform 404 for phase Y and waveform 405 for phase X. The amplitude and waveform of 404-405 is regulated by inverter 2 to be close to nominal value for the utility service. Because the voltage on capacitors 96 and 97 is larger than the largest overvoltage in the incoming utility phases, inverter 2 reduces it to nominal value on the output. It acts as a buck regulator and is therefore called a Buck Inverter.

It is evident from FIG. 4 that the whole device acts as a power conditioner. The output voltage waveforms are constant while input voltages change. There are numerous high frequency, versus utility service frequency, distortions of the utility voltage waveform. Those distortions are attenuated by filter 3 in conjunction with capacitors 96 and 97. Because those capacitors have enough capacitance to maintain voltage near constant while the input voltage varies with utility service frequency, capacitors 96–97 are able to do even more so under distortions at higher frequencies and shorter duration. Output inverter 2 voltage waveforms are internally controlled and regulated and because the input voltage to inverter 2 from capacitors 96 and 97 is stable within and outside of the frequency bandwidth of this regulator, the output voltages are stable and distortion free.

Symmetrical Operation

There are three sets of capacitors: input filter 3—capacitors 33 and 34; output filter 4— capacitors 43 and 44; and DC link capacitors 96 and 97. Capacitors in each set have substantially the same electrical characteristics and divide input voltage, output voltage, and DC voltage in half versus the conductor which connects their common terminals. Voltage on those capacitors is symmetrical versus this common conductor, and allows for universal service application as will be described below.

Converter 1 Power Circuit Operation

Referring again to FIG. 1, under steady state conditions, capacitors 96 and 97 are charged to voltages exceeding peak phase voltages. There is positive voltage on conductor 94, versus symmetry conductor 60, and there is negative voltage on conductor 95, versus symmetry conductor 60. Switches 11 and 12 are turned on and off, pulse width modulated, with a switching frequency much higher than the utility service frequency. Switches 11 and 12 are complementary on or off during each period of the switching frequency, i.e., if switch 11 is on, then switch 12 is off, and vice versa.

During a positive cycle of utility voltage in phase X, when switch 12 is on, the sum of voltages in utility phase and on capacitor 97 is applied across choke 31. Then, the current through this choke starts increasing until switch 12 is turned off. At this instant, choke 31 current is switched from going through switch 12 to going through diode 15 to charge capacitor 96. The circuit acts as a boost converter. During a negative cycle of the utility voltage in phase X, current in choke 31 is increasing in value when switch 11 is on and capacitor 97 is charged through diode 16. Phase Y of converter 1 uses switches 13 and 14 and diodes 17 and 18, and operates similarly. Both utility phases are used to charge capacitors 96 and 97. The purpose of filter capacitors 33 and 34 is to filter switching frequency current fluctuations drawn by converter 1 from utility service phase conductors through chokes 31 and 32.

The purpose of snubber inductors 91 and 61 is to limit the rate of rise of the current through, for example, diode 15 and switch 12 when switch 12 is turned on. At this instant, because of diode recovery characteristics, the diode and switch are in a conducting state and short capacitors 96 and 97 in absence of chokes 61 and 91. The same current rise limiting effect occurs when the three other switches 11, 13, and 14 are turned on. The diode-resistor circuits across snubber chokes 91 and 92 discharge those chokes after the recovery period of diodes 15–18 which is usually within the 100 nanosecond range.

Inverter 2 Power Circuit Operation

Inverter 2 phase X operates in the following way. Switches 21 and 22 are complementary turned on and off during each period of the switching frequency. This switching frequency is much higher that utility service frequency and not necessarily the same as the converter 1 switching frequency. When switch 21 is on, voltage across capacitor 96 is equal to ½ of the DC link voltage between conductors 94 and 95, and is applied on the input of the filter 4, choke 41 and capacitor 43. It causes current to increase through choke 41. When switch 21 is turned off, current through choke 41 gets diverted through diode 26 and voltage across capacitor 97 is applied across the same filter, choke 41 and capacitor 43. If switch 21 is in its on state 50% of the switching period, those voltages are equal in amplitude and duration, and opposite in polarity. Therefore the voltage on the filter output is zero as the filter averages the input voltage. When switch 21 is on longer than 50% of its period of switching frequency, positive polarity voltage is produced on the output capacitor 43, and when the period is less than 50%-negative polarity is produced. The maximum amplitude on the output is equal to the voltage value on capacitors 96 and 97. The circuit acts as a buck converter. The same phenomena happens when the current is flowing out of choke 41. Then switch 22 and diode 25 act as a buck converter. In combination, both pairs, switch 21 and diode 26, and switch 22 and diode 25, act as a buck converter for any direction of the current though choke 41. The other phase (Y) of inverter 2, consisting of switches 23 and 24 and diodes 27 and 28, operates substantially identically.

Filter capacitors 43 and 44 filter out switching frequency current fluctuations from propagating to the load output. Snubbers 7 and 8 operate identically to snubbers 6 and 9. They limit the rate of current rise from capacitors 96 and 97 at the instant when any switch 21–24 is turned on and its corresponding diode is in the recovery period of less than approximately 100 nanoseconds.

Converter 1 Control Circuit Operation

Referring to FIG. 2, voltage on DC link between conductors 94 and 95 is fed through voltage level conditioner 201 to one input of the error amplifier 204, with reference voltage Vref on the other input. When both of those voltages are the same, the output of amplifier 204 is zero; when they are different, the difference is amplified with high gain determined by the DC voltage regulation requirements. Both the output of the error amplifier 204 and conditioned voltage from 201 are fed into summing amplifier 220 which creates an amplitude reference for pulse width modulation circuits 209 and 210. The output of summer 220 is fed on one input of voltage multipliers 207 and 208 which are fed on the other inputs with voltage waveforms proportional to waveforms on utility phases X and Y, through respective conditioners 202 and 203. Outputs of multipliers 207 and 208 are proportional to utility phase voltage waveforms X and Y, and have the same frequency and phase. Amplitudes of those waveforms are proportional to the output of summer 220. When the load on DC capacitors 96 and 97 changes, it causes the voltage on these capacitors to be near constant, or regulated.

Regulated voltage waveforms from multipliers 207 and 208 are fed to PWM circuits 209 and 210. Circuits 209 and 210 function to produce a chain of pulses on the output which have pulse widths proportional to the value of the input voltage at the instant of the pulse generation. The frequency of those pulses is much higher than the utility service frequency. There are numerous well known PWM methods and circuits which can be used.

Output of PWM circuits are fed to drive semiconductor switches in converter through its respective drivers 213–216. As was shown earlier, each set of switches, 11 and 12, and 13 and 14, are turned on or off complementary. This is accomplished by logic inverters 211 and 212. When one of the switches in the set is on, the other is off.

Drivers 213–216 shift the level of voltage to match with the voltage level on control terminal "C" of any switch 11–14, change the voltage amplitude to match with the one required on terminals "C", and provide sufficient power. There are numerous well known driver circuits.

PWM signals driving switches 11–14 cause average voltage on conductors 53 and 54 to be almost equal to phase voltages X and Y respectively. This creates a condition for unrestricted current flow in and out of the DC link between converter 1 and inverter 2 to and from utility phases X and Y. If the current control method is selected for PWM circuits, the waveform of the current in each phase can be made to order and, in particular, is preferably a sinewave, in phase with utility voltages. This is the desired condition for a unity power factor.

Inverter 2 Control Circuit Operation

Referring to FIG. 3, two sinewave voltage reference generators 301 and 302 are shown. Both have phase lock loop circuits which synchronize and phase lock those waveforms to utility phase voltages X and Y respectively. The outputs of those generators are fed to error amplifiers 305 and 306 which have on the other input, feedback voltages from output phases X and Y of inverter 2. When voltage waveforms on the input of the error amplifiers are the same, an error voltage on the amplifiers, output is zero. Output of error amplifiers and reference generators are fed to summing amplifiers 307 and 308.

PWM circuits 309 and 310 for each phase X and Y are fed by summing amplifiers output voltage waveforms. They function similarly to converter control circuits 209 and 210 and produce a chain of pulses with widths proportional to voltage values on the input. Those chains of pulses are fed to inverter switches 21–24 through drivers 313–316 and logic inverters 311 and 312, which all function similar to converter control drivers 213–216 and logic inverters 211–212. The result is that the average voltage on conductors 57 and 58 of inverter 2 is proportional to sinewave reference waveforms generated by internal generators 301 and 302. Because filter 4 averages the voltage on conductors 57 and 58, the output voltages on phases X and Y have a sine waveform at the same frequency and phase as utility phases X and Y and with the amplitude arbitrarily regulated by selecting parameters for the control circuit. Usual selection requires the amplitude of output voltage on both phases to be the same and equal to the nominal value of the utility service voltage.

In summary, the transfer function for the power conditioner of the present invention is:

$$V_{load\,X} = V_{nom} * sin(w_{util}*t);$$

$$V_{load\,Y} = V_{nom} * sin(w_{util} * T + \text{phase } X\text{-}Y); \text{ and}$$

$$V_{util\,X} = V_X * sin(w_{util}*t); \text{ and}$$

$$V_{util\,y} = V_y * sin(w_{util}*t + \text{phase } X\text{-}Y).$$

where:

$V_{util} = 2f_{util}$;
$f_{util}$ = utility service frequency;
t = time; where:
$V_X$ = peak value of voltage in phase X;
$V_Y$ = peak value of voltage in phase Y; and
$V_{nom}$ = nominal peak phase volage So, the output voltages on phases X and Y, in relation to symmetry conductor 60, are the same in frequency and phase as utility voltages on phases X and Y, respectively, in relation to the same symmetry conductor 60. The difference is that the amplitude of the output voltages are nominal for a selected utility service and do not change when the utility voltages change.

Examples of Conditioner Operation With Different Utility Services, FIGS. 5–8

Figure 5A:
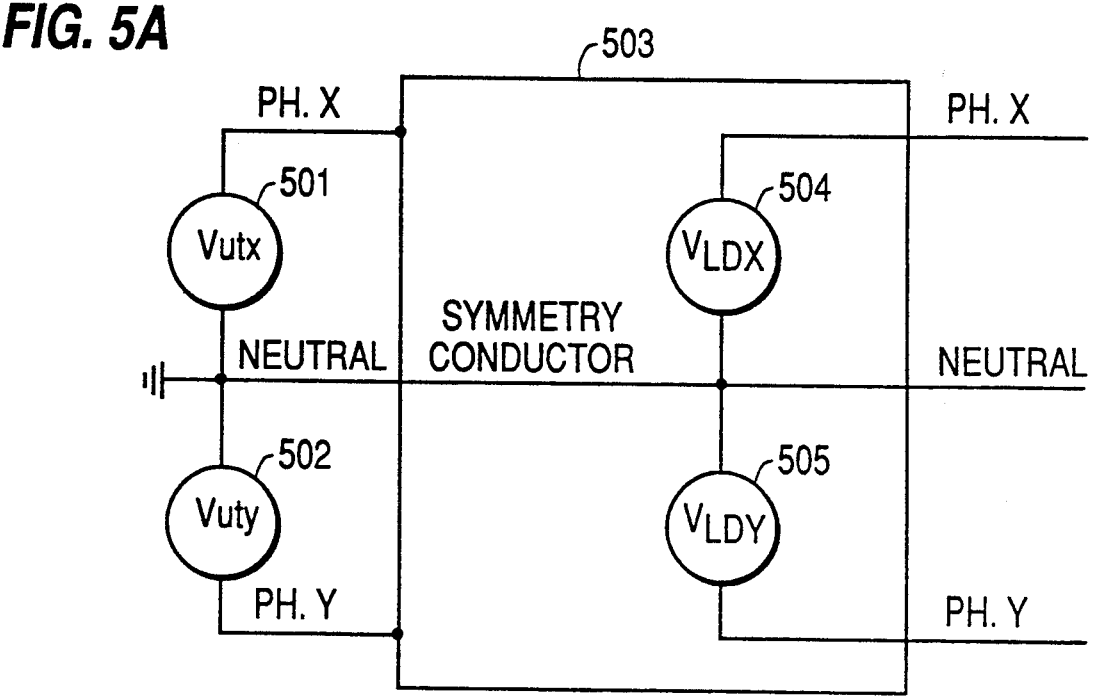
FIG. 5A shows an equivalent circuit of operation of the present invention.

FIG. 5A shows a functional diagram of the conditioner of the present invention with a dual phase service of 120 or 240 degrees phase shift between phases and with common grounded conductor, neutral. Blocks 501 and 502 represent input voltage utility sources, phases X and Y, respectively. Block 503 in FIG. 5A represents the conditioner of the present invention. Within block 503, blocks 504 and 505 represent the output load voltage sources for phases X and Y, respectively.

Figure 5B:
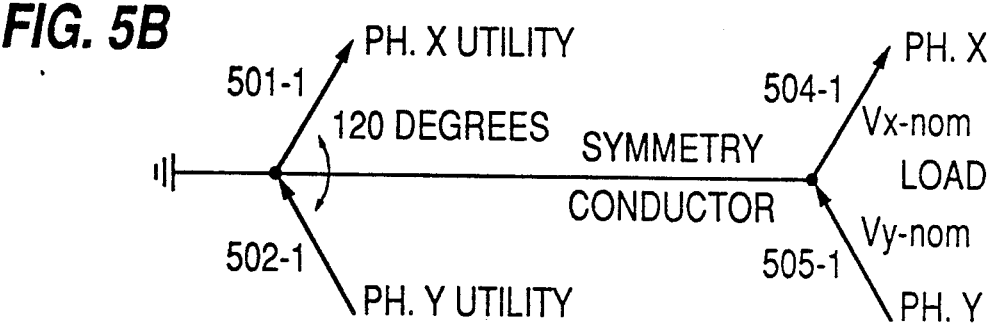
FIGS. 5B and 5C show voltage phase diagrams for dual phase service with a phase shift of 120 or 240 degrees.
Figure 5C:
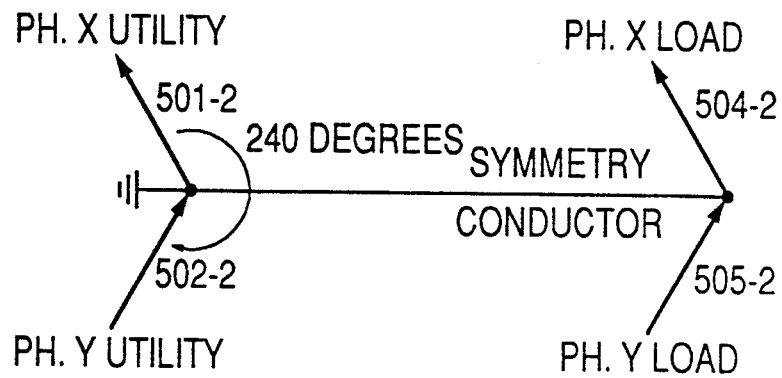

Because all voltages are of the same frequency and sinewave, phase diagrams shown in FIGS. 5B and 5C are used to explain the operation. Phase diagrams for 120 and 240 degrees phase shift cases are shown in FIGS. 5B and 5C, respectively. Because there is a grounded common conductor which is tied to ground, output voltages on phases X and Y are referenced to ground and have nominal phase voltage versus ground potential. FIG. 5B shows voltages 501-1 and 502-1 for utility voltages for phases X and Y, respectively, shown 120 degrees apart. Similarly, the output voltages 504-1 and 505-1 for phases X and Y, respectively, are 120 degrees apart. In FIG. 5C, input utility voltages 501-2 and 502-2 for phases X and Y, respectively, are 240 degrees apart. The same condition is shown for output voltages 504-2 and 505-2.

Although not specifically shown, it is self evident from FIG. 1 that if the phase difference between utility phases X and Y is 180 degrees, i.e., split phase service, the output phases also will be in split phase configuration, with grounded common conductor, and each phase voltage having potential with respect to ground equal to a nominal utility phase voltage.

Figure 6A:
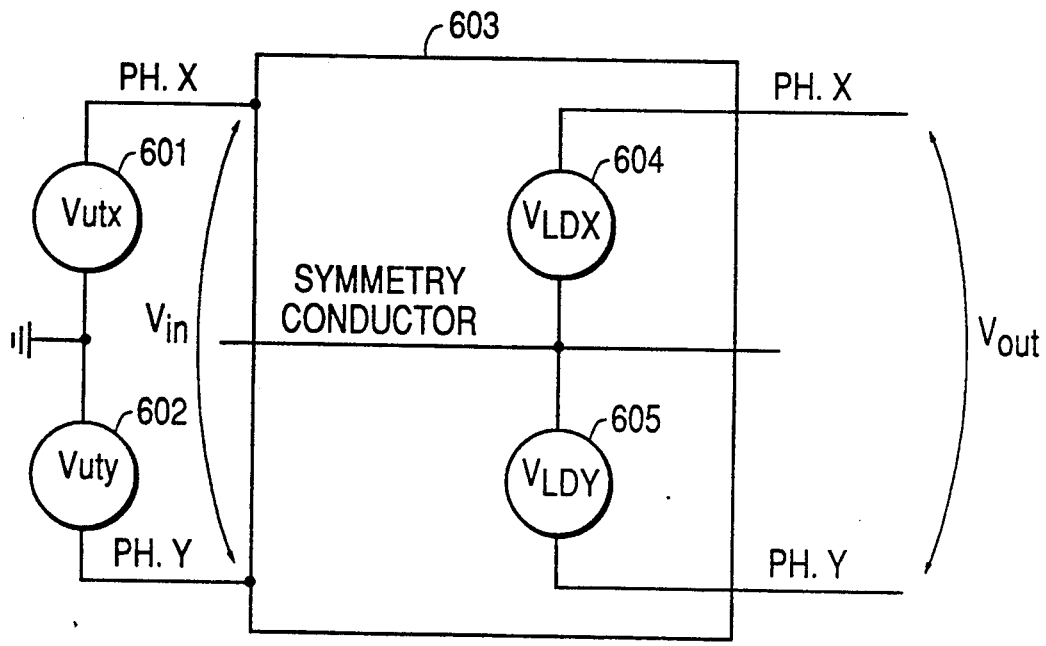
FIG. 6A shows an equivalent circuit of operation of the present invention.

FIG. 6A shows a functional diagram of the conditioner of the present invention with a dual phase service without use of common grounded conductor. As in FIG. 5A, blocks 601 and 602 represent utility voltage sources for phases X and Y, respectively. Block 603 represents the conditioner of the present invention, with load voltage sources 604 and 605 for phases X and Y, respectively.

Figure 6B:
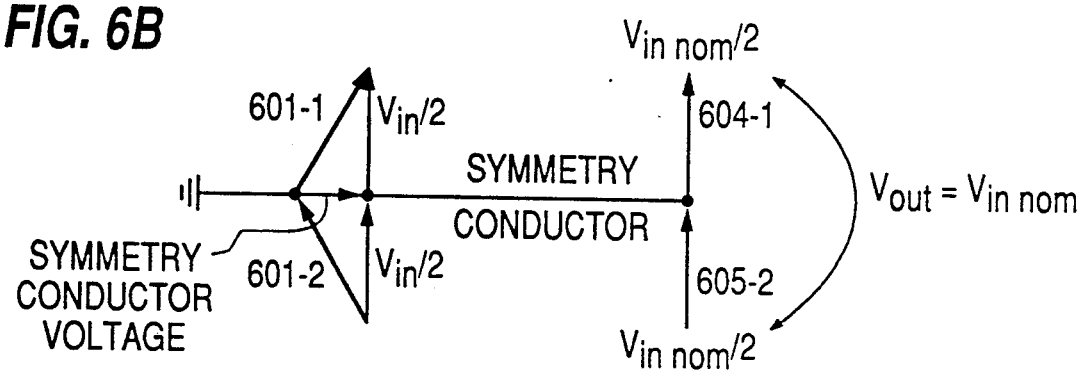
FIG. 6B shows a voltage phase diagram for dual phase service without use of the common grounded conductor, usually 208 V service in the USA or Canada.

Phase diagram FIG. 6B shows two phase voltages referenced to ground. The voltage between phases is applied on the input of the conditioner. If nominal phase voltages are 120 V, then voltage between phases is 208 V. The symmetry conductor voltage with respect to any phase conductor is one half between phase voltage. The output phases 604-1 and 605-1 are in phase with half of the input utility phase vectors (shown as Vin/2 in FIG. 6B), the voltage input utility phases X and Y shown as 601-1 and 601-2. Their nominal value setting is a half of the voltage between phases, 104 V each in case of 208 V between input phases nominally. The voltage between each output phase to ground is the same as nominal utility phase voltages.

Figure 7A:
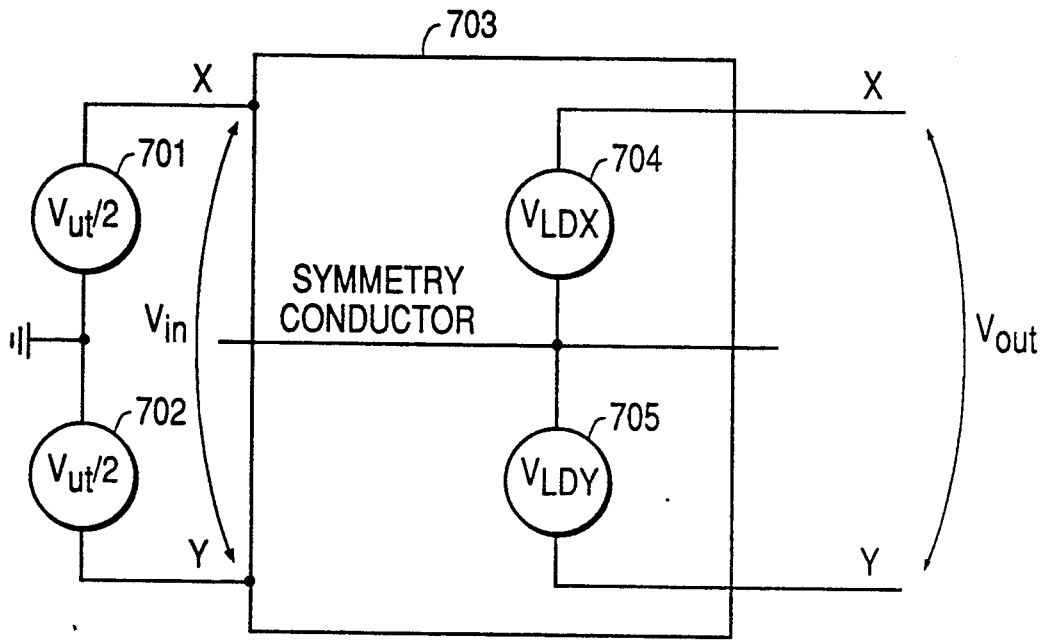
FIG. 7A shows an equivalent circuit of operation of the present invention.
Figure 7B:
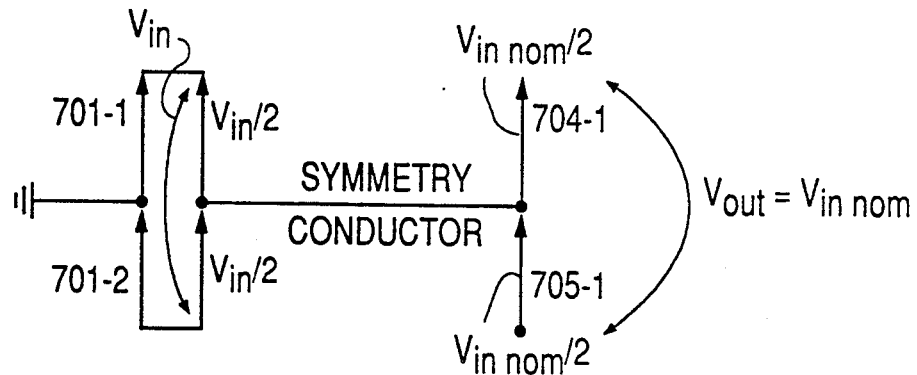
FIG. 7B shows a voltage phase diagram for single phase service with center point grounded, usually called split phase service.

FIG. 7A shows the functional diagram of the conditioner of the present invention, with operation from split phase service without use of the grounded conductor. Again, input voltage sources 701 and 702 are shown for phases X and Y, respectively. In this example, each phase has one half the input utility voltage, and is represented as Vin/2. Block 703 shows the conditioner of the present invention, with output load voltage sources 704 and 705 for phase X and Y, respectively.

The input/output voltage phase diagram is shown in FIG., 7B. Split phase voltages 701-1 and 701-2 are of equal value and are 180 degrees phase shifted with respect to a common grounding conductor. The voltage between phases is double the phase voltage. This double phase voltage is applied to the conditioner input.

The conditioner operates in such a way that the voltage on the symmetry conductor is a half of the input voltage in amplitude and, because of this, makes the potential of the symmetry conductor equal to the common grounded conductor (neutral) of the utility service.

Output phases are the same as voltages between each conditioner input utility phase with respect to the symmetry conductor, only amplitudes are regulated. Phase diagram 7B shows that each output phase voltage will have potential with respect to ground equal to the utility phases at nominal values.

Figure 8A:
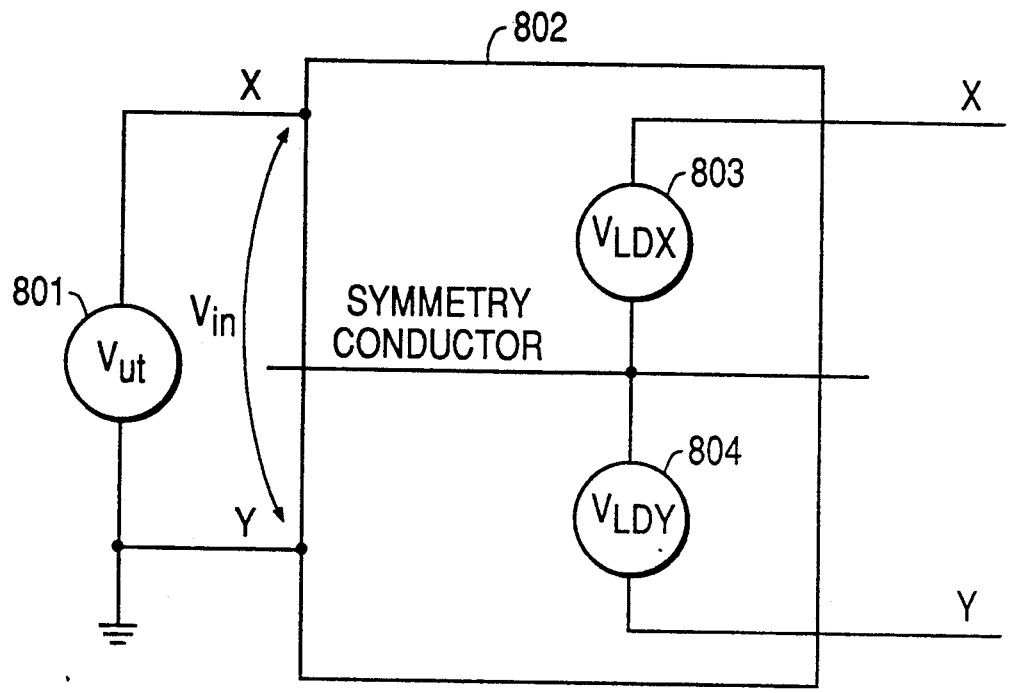
FIG. 8A shows equivalent circuit of operation of the present invention.
Figure 8B:
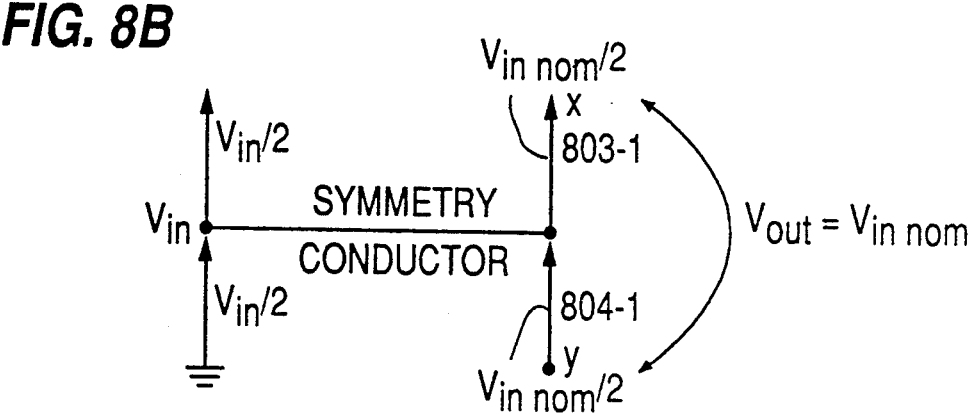
FIG. 8B shows a voltage phase diagram for single phase service with one of the input conductors grounded.

FIG. 8A shows a functional diagram of the conditioner of the present invention connected to a utility service having a single phase, with one power conductor grounded. FIG. 8B is a phase diagram showing phase voltages on the input and output.

The conditioner makes its symmetry conductor to have a potential equal to half the input utility phase voltage (801). Two output phases X and Y (803, 804) are the same as two input phases X and Y with respect to a symmetry conductor with the exception that their amplitude is regulated.

The voltage on phases X and Y on the output with respect to ground are:

$V_{load\ X} = V_{nom}/2 + V_{util}/2$ $V_{load\ Y} = V_{nom}/2 + V_{util}/2$

If the utility voltage is nominal, then the potential of phase Y to ground is zero, similar to the utility phase Y on the input. And the phase X to ground or to phase is equal to the utility nominal voltage similar to the utility service voltage 801.

If the utility voltage differs from nominal, then the phase potential to ground will be equal to half the difference between the utility service voltage and its nominal value. Therefore, the phase Y voltage to ground will not be zero, similar to the utility service phase if it were grounded. If the utility service varies within a wide range of 20% of the nominal value, output phase Y voltage to ground will vary within 10% of the nominal value. The voltage of phase X to ground will be equal to the average utility service voltage, and its nominal value, which is always smaller than the maximum possible value of the input utility phase X voltage, because the maximum value is larger than the nominal value.

In this mode of operation, there is a common mode voltage on the output equal to a half of the difference between input and nominal output voltages. This voltage is similar in value compared to voltages existing on common/neutral conductor of electrical services, and is sinewave in nature, so there are no high frequency harmonics causing malfunctions in connected loads or safety related affects.

FIG. 8B shows input voltages as Vin/2 and output voltages 803-1 and 804-1 for phases X and Y, respectively. The output voltages 803-1 and 804-1 are 180 degrees apart and each has a voltage which is one half the nominal input voltage, represented as Vin nom/2. Therefore, the output voltage, Vout, is equal to the nominal input voltage, Vin nom.

While the present invention has been disclosed with respect to a preferred embodiment and modifications thereto, further modification will be apparent to those ordinarily skilled in the art within the scope of the claims that follow. Therefore, it is not intended that the invention be limited by the disclosure, but instead that its scope be determined entirely in reference to the claims which follow.

I claim:

1. An electrical power conditioning apparatus for receiving an unregulated input AC voltage and providing a regulated AC output voltage, said apparatus comprising:

input terminal means for connecting said apparatus to two power carrying conductors;

input voltage divider means connected in series between said power carrying conductors for dividing the voltage across said two power carrying conductors and providing a divided voltage, said input voltage divider means being formed of two equal impedances having a common connection point;

voltage converter means having an input coupled to said input terminal means for receiving and converting the voltage across said two power carrying conductors to a regulated DC voltage across electrical charge storage means connected to the output of said voltage converter means, said DC voltage having a value larger than the peak voltage across said two power carrying conductors, said electrical charge storage means being formed of two electrically equal and serially connected storage elements having a common connection point;

voltage inverter means having an input coupled to said electrical charge storage means for receiving and inverting said DC voltage to a regulated AC output voltage at an output of said voltage inverter means;

output voltage divider means connected in series across said output of said voltage inverter means for dividing said regulated AC output voltage, said output voltage divider means being formed of two equal impedances and having a common connection point;

output terminal means coupled to said output of said voltage inverter means for providing said regulated AC output voltage to a load; and connection means for connecting together said common connection point of said input voltage divider means, said electrical charge storage means and said output voltage divider means wherein this connection means can be connected to a third power carrying conductor identified as a neutral conductor on input means and output means if this conductor is provided from said electrical service.

2. An apparatus according to claim 1, wherein said impedances are formed of capacative elements.

3. An apparatus according to claim 1, wherein said voltage converter means includes filter means for filtering the voltage across said two power carrying conductors, said filter means being formed of inductive elements.

4. An apparatus according to claim 3, wherein said filter means produces a voltage on said input voltage divider means which is proportional to the average voltage of the switching waveform generated by said voltage converter.

5. An apparatus according to claim 1, wherein said voltage converter is formed of a plurality of semiconductor switching elements, the operation of said switching elements being controlled by associated control means.

6. An apparatus according to claim 5, wherein said control means controls the operation of said semiconductor switching elements in accordance with the level of the voltage across each respective one of said two power carrying conductors and the voltage across said electrical charge storage means.

7. An apparatus according to claim 6, wherein said control means includes first voltage level conditioning means for conditioning the level of voltage across one of said two power carrying conductors and providing a first conditioned voltage, second voltage level conditioning means for conditioning the level of voltage across the other of said two power carrying conductors and providing a second conditioned voltage, third voltage level conditioning means for conditioning the level of voltage across said electrical charge storage means and providing a third conditioned voltage, said first, second and third conditioned voltages being used to control the duty cycle of operation of said semiconductor switches.

8. An apparatus according to claim 6, further including first and second voltage multiplier means for receiving and multiplying said first and second conditioned voltages, respectively, said multiplied voltages being used to control the operation of duty cycle control means for said semiconductor switches.

9. An apparatus according to claim 8, further including comparator means for comparing the level of said third conditioned voltage to a reference voltage, the output of said comparator means being used to control the operation of said first and second voltage multiplier means.

10. An apparatus according to claim 9, further including driver means coupled to said duty cycle control means for separately controlling the operation of each of said plurality of semiconductor switches.

11. An apparatus according to claim 1, wherein said voltage inverter is formed of a plurality of semiconductor switching elements, the operation of said switching elements being controlled by associated control means.

12. An apparatus according to claim 11, wherein said voltage inverter means includes filter means for filtering the voltage across said two power carrying conductors, said filter means being formed of inductive elements.

13. An apparatus according to claim 12, wherein said filter means produces a voltage on said output voltage divider means which is proportional to the average voltage of the switching waveform generated by said voltage inverter.

14. An apparatus according to claim 11, wherein said control means controls the operation of said semiconductor switching elements in accordance with the level of the voltage across each respective one of said two power carrying conductors and the level of said regulated AC output voltage.

15. An apparatus according to claim 11, wherein the operation of said semiconductor switching elements is controlled by varying the duty cycle of said switching elements.

16. An apparatus according to claim 11, wherein said control means includes first voltage level conditioning means for conditioning the level of voltage across one of said two output power carrying conductors and providing a first conditioned voltage, second voltage level conditioning means for conditioning the level of voltage across the other of said two output power carrying conductors and providing a second conditioned voltage, third and fourth voltage level conditioning means for conditioning the level of voltage across said input power carrying conductor for providing third and fourth conditioned voltages, respectively, said first, second, third and fourth conditioned voltages being used to control the duty cycle of operation of said semiconductor switches.

17. An apparatus according to claim 16, further including first and second sinewave reference generator means for said third and fourth conditioned voltages, respectively, said sinewave reference means providing a corresponding sine wave reference signal with the same frequency and phase as each of said third and fourth conditioned voltages, said reference signals being used to control the operation of duty cycle control means for said semiconductor switches.

18. An apparatus according to claim 17, further including a first comparator means for comparing the level of said first conditioned voltage to one of said sinewave reference signals and generating a first error signal, a second comparator means for comparing the level of said second conditioned voltage to the other of said sinewave reference signals and generating a second error signal, said error signals being used to control the operation of said duty cycle control means.

19. An apparatus according to claim 18, further including driver means coupled to said duty cycle control means for separately controlling the operation of each of said plurality of semiconductor switches.

* * * * *